3,758,432
METHOD OF PRODUCING LATEX PAINT
Theodore R. Hopper, Severna Park, Md., assignor to FMC Corporation, New York, N.Y.
No Drawing. Continuation of application Ser. No. 12,453, Feb. 18, 1970. This application Nov. 26, 1971, Ser. No. 202,691
Int. Cl. C08f 45/44; C09d 5/02
U.S. Cl. 260—29.6 MN — 2 Claims

ABSTRACT OF THE DISCLOSURE

A method of producing pigmented latex paints in which the pigment is dispersed in water, together with, as an essential multifunctional ingredient, isooctyl carbamate, and the pigment dispersion is then added to the latex.

---

This is a continuation of application Ser. No. 12,453, filed Feb. 18, 1970.

BACKGROUND OF THE INVENTION

(A) Field of the invention

This invention relates to a method of producing latex paint by dispersion of the pigment in an aqueous medium, followed by admixture of the dispersion with latices.

(B) Description of the prior art

The conventional oil-based paints have been widely replaced by the so-called latex or emulsion paints in the past twenty years. Emulsion paints are composed of a pigment dispersion and a resin dispersion, and are prepared by mixing the two dispersions. The pigment dispersion is obtained by milling the pigments into water. The resin dispersion is either a latex formed by emulsion polymerization or a resin put into emulsion form. Emulsion paints are thinnable with water, and equipment used in their application can be cleaned up by washing with water.

One of the problems with latex paints is that of dispersion of the pigment. The pigments are ground with a dispersant and a protective colloid with a minimum amount of water. To obtain dispersion of any pigment requires the impartation of energy to separate the individual particles and wet out the surface of the pigment. It has been found in emulsion paints that it is not desirable to disperse the pigment in the presence of the latex solids. The pigment is dispersed in water with the help of dispersing aids to wet the pigment and keep the particles separated. The colloid also protects the system from coagulation in the presence of an electrolyte or from excessive sheer stress. The dispersing agent, invariably included in conventional practice, is usually an organic detergent/wetting agent of anionic or nonionic type. The dispersing medium often contains a deflocculant such as potassium tripolyphosphate and a very small amount of anti-foaming material. Additional additives often include a thickener such as methyl cellulose, hydroxyethyl cellulose, or an alginate; an alcohol such as ethylene glycol or an ether alcohol, diethylene glycol monoethyl ether. A bactericide, invariably used in emulsion paint formulations, may be added to the aqueous mixture used for dispersing the pigments, or it may be added later.

The bulk of the pigment and fillers in the formulations is conventionally dispersed in mixtures of this sort in some conventional rapid-acting dispersion equipment. Since most paints are white or tints off-white, and since titanium dioxide, the common white pigment and common filler materials disperse somewhat more readily than the color pigments, generally, white pigments are dispersed by a rapid dispersion machine such as a colloid mill or a high speed mixer such as the Cowles Dissolver. The latex is then mixed in, and the resulting white paint is tinted after manufacture with a separately prepared color pigment paste where the color value is fully developed in a more heavy-duty type of dispersing machine. Where deeper colors are to be employed, the entire pigment may be dispersed in the water portion of the formulation in a pebble mill or a sand mill prior to admixture with the latex.

After the pigment dispersion is complete, it is simply mixed in with the latex of choice, generally thickened somewhat by the addition of a thickening material, and very often blended with a small amount of an agent to prevent bubbling on application.

One of the difficulties with latex paints has been their relative long-range sensitivity to water as compared with standard oil and alkyd paints. The problem arises at least in part from the fact that the latices generally contain water-soluble dispersing agents to keep the polymer globules in the latex suspended, not only during manufacture and shipping, but also in the case of freezing and thawing which may occur on storage. This is compounded by the fact that in the dispersion of the pigment it has been considered necessary to use water-soluble surfactants such as the conventional non-ionic and anionic surfactants.

Various attempts have been made to replace these surfactants, such as (for example) by the use of ammonium salts of acid resins such as partially esterified resin esters and styrene-maleic adducts. However, these replacements are all characterized by water solubility, and it has been considered essential to use as the dispersing agent an aqueous solution of at least some non-volatile organic wetting agent. It is known that non-water-soluble materials can be present during the dispersion step in a minor degree, and the standard anti-foaming agents used in the dispersion of the pigment are not water-soluble.

SUMMARY OF THE INVENTION

I have now discovered that isooctyl carbamate is a multifunctional aqueous emulsion paint additive that reduces the surface tension of water, helps perform both the pigment dispersion and wetting functions, has a desirable mild plasticizing and coalescing action and does not adversely affect the freeze-thaw stability of the finished emulsion paint formulation. In general, the paint films produced by the use of isooctyl carbamate show improvement in scrubbability over those produced with conventional wetting agents.

The effective amount of isooctyl carbamate is 0.01 to 1% by weight based on the weight of total paint. The isooctyl carbamate is a single ingredient that replaces several different common constituents of emulsion paints, either in whole or in part, which previously were indispensible in formulating emulsion paints. The use of isooctyl carbamate simplifies the recipe for emulsion paint as fewer ingredients are required and compatibility problems are thereby lessened. Paint film improvements apparently result from reducing the amount of water-soluble ingredients included in the paint formulation. The freeze-thaw stability of the paint is also generally better because smaller amounts of coalescing solvents are required to achieve good paint film formation at low temperatures. A defoamer may be omitted during dispersion of the pigment and in some paints the total thickener level may be reduced.

DESCRIPTION OF THE INVENTION AND THE PREFERRED EMBODIMENTS

Isooctyl carbamate can be made by reacting 1 mole of isooctyl alcohol with 1 mole of phosgene to yield 1 mole of chloroformate, and treating the chloroformate with ammonia ($NH_3$) in some form, or with an amine, to form the isooctyl carbamate. The methods of producing the carbamates are described in the technical literature: for the urea-alcohol process see Chemical Reviews, vol. 65, pp. 567 et seq. "Esters of Carbamic Acid" by Phillip Adams and Frank A. Baron and for the ammonolysis of an appropriate chloroformate, see Encyclopedia of Chemical Technology, edited by R. E. Kirk and D. F. Othmer, 1st ed., vol. 14, pp. 473 et seq. So-called "mixed" isooctyl carbamates are useful and are prepared from commercial "isooctyl" alcohols prepared by the "oxo" process (for example, by the addition of carbon monoxide and hydrogen to mixtures of heptenes in the presence of a cobalt catalyst).

In preparing the paint compositions of the present invention, the isooctyl carbamate is premixed with water and the other ingredients used to disperse the pigment. A small amount of thickener is generally combined with the isooctyl carbamate to increase the viscosity of the water. The most widely used thickeners are hydroxy ethyl cellulose, methyl cellulose, sodium alginate, sodium polyacrylate and casein. They are used in very small amounts, of the order of 1% of the dispersion vehicle.

The grinding solution may or may not contain an antifoaming agent in addition to the isooctyl carbamate, and I have operated with or without conventional water-insoluble anti-foamers. Most of these formulations contain an antifreeze such as ethylene glycol or propylene glycol. These are generally present in somewhat larger quantities of the order of up to 10% of the aqueous dispersion medium and 3 to 5% of the total paint formulation.

The aqueous pigment dispersion contains a bactericide used to prevent the development of mold and fungus in the paint can as well as on the finished paint film. Typical satisfactory materials are organic mercury compounds which are widely used for this purpose in very small concentrations.

A standard additive which I have found highly useful is a very small amount, of the order of a fraction of 1%, of an inorganic defloculant such as potassium tripolyphosphate.

The isooctyl carbamate is generally used in sufficient quantity to produce a finished paint containing from about 0.1 to 1.0% by weight of isooctyl carbamate. Less than 0.1% ordinarily results in slow pigment dispersion, and poor deaeration during the dispersing step, while above 1%, no advantage is gained and there is some tendency to soften the dry paint film.

As indicated above, the water is mixed with the pigments and the mixture is passed through a dispersing mill, preferably of the simplest sort which will produce the desired dispersion. Where only white pigments and extenders are being dispersed, this can be a very simple machine, such as a colloid mill, or a high shear mixer such as the Cowles Dissolver, and dispersion occurs very easily and rapidly. If hard grinding color pigments are to be dispersed at this point, I prefer to use a pebble mill or a sand mill.

After the pigment has been dispersed, it is mixed with the latex, thickened to some extent with one of the conventional thickeners and a small amount of an anti-foaming agent is added to prevent the development of bubbles when the paint is applied. The thickeners and defoamers are chosen from the same group as are used in the preparation of the pigment dispersion. If light colors are to be made, they are generally made in conventional fashion, tinting the completed paint with a small amount of a paste of the desired color. These are made in machines which insure the development of a full color mixture and they may be any pigment in any vehicle which is compatible with the latex paint.

Most commercial latices are manufactured by a technique known as emulsion polymerization. The monomer or mixture of monomers is dispersed in water in small droplets, often homogenized, and the polymerization takes place within these droplets. Because of good heat transfer through the water phase, the heat of polymerization can be removed easily and the polymerization proceeds rapidly. High molecular weight polymers are produced. The three principal latex systems used today are styrene-butadiene, polyvinyl acetate and acrylics, though resins such as alkyds, and epoxides can be produced in emulsion form by post-emulsification.

Copolymerization of monomers in which two or more different monomers are converted into a homogeneous polymeric product is frequently conducted to obtain latices which have a good blend of properties. This is done because no resin to date has been discovered which is best in all properties such as light resistance, adhesion, hardness, etc. Acrylic emulsions for use in latex paint are frequently copolymers of methyl methacrylate with varying amounts of acrylic esters (and sometimes non-acrylic monomers) to lower the minimum film forming temperature of the emulsion paint. Minor amounts of functional monomers are also used in the manufacture of acrylic copolymers to improve the pigment binding, emulsion stability, and other properties of the latex and polymer. Basic acrylic monomers include methyl methacrylate, ethyl methacrylate, n-butyl methacrylate, isobutyl methacrylate, lauryl methacrylate, stearyl methacrylate, methyl acrylate, ethyl acrylate, n-butyl acrylate, 2-ethylhexyl acrylate, cyclohexyl methacrylate, 2-ethylhexyl methacrylate, and functional acrylic monomers which can be copolymerized with the basic monomer include methacrylic acid, acrylic acid, acrylamide, 2-hydroxyethyl methacrylate, glycidyl methacrylate, 2-hydroxypropyl methacrylate, dimethylaminoethyl methacrylate, tert-butylaminoethyl methacrylate, ethylene dimethacrylate, trimethylolpropane trimethacrylate, butylene dimethacrylate, diethylaminoethyl acrylate. Acrylic copolymers with polyvinyl chloride, vinyl ethylene and polyvinyl acetate are used in commercially available latices.

The method of my invention appears to be applicable to most latices, and to all commercial latices available in the United States. Rather than produce special latices, I have worked with many of the commercially available common latices including acrylic latices such as Rhoplex AC-22 (Rohm and Haas), polyvinyl acetate homopolymers such as Polyco 522 (Borden Chemical) polyvinyl acetate copolymers such as Resyn 2243 (National Starch) and Polyco 804-PL (Borden Chemical), vinyl acrylic copolymers such as UCAR Latex 180 (Union Carbide), vinyl ethylene copolymers such as Elvace (du Pont), styrene butadiene copolymers (Dow), and polyvinyl chloride acrylic copolymers such as Geon 450X20 (Goodrich).

As a method for testing my invention, I used latices made by different manufacturers and followed their directions for making their materials into a latex paint, as set forth in their technical literature. I then made a comparable material, substituting isooctyl carbamate and potassium tripolyphosphate for the water-soluble dispersing aids (wetting agents) of the formulations, and generally for the anti-foaming agent in the formulation. The formulations were then compared for weight per gallon, viscosity, freeze/thaw stability, accelerated aging, scrub resistance, and application properties.

SPECIFIC EXAMPLES OF THE INVENTION

The following specific examples are given by way of illustration and not of limitation. In the examples all the parts are shown by weight. Moreover, in each example the manufacturer's recommended formulation and my formulation are shown in corresponding columns. Tests in all examples were preformed as in Example I.

EXAMPLE I.—VINYL-ACRYLIC COPOLYMER LATEX PAINT

| | Mfgs. recommended formulation | FMC formula |
|---|---|---|
| Water | | 197.51 |
| Cellulosic thickner, 3% aqueous solution (Natrosol 250 MR) | 150.00 | |
| Sodium polycarboxylate (Tamol 731) | 10.00 | |
| Nonionic surfactant (Tergitol NPX) | 1.50 | |
| Potassium tripolyphosphate | | .99 |
| Isooctyl carbamate | | 5.64 |
| Phenylmercuric acetate (PMA 30) | 5.00 | 4.94 |
| Ethylene glycol | 20.00 | 19.75 |
| Diethylene glycol monoethyl ether (carbitol) | 15.00 | 14.81 |
| Defoamer (colloids 581B) | 3.00 | |
| Blend above ingredients and add with high shear: | | |
| Titanium dioxide (Rutile TiO₂) | 175.00 | 172.82 |
| Ground silica (Gold Bond R) | 50.00 | 49.38 |
| Calcium carbonate | 100.00 | 98.76 |
| Reduce stirring speed and add— | | |
| Vinyl-acrylic latex (UCAR 180) | 398.00 | 393.05 |
| 3% aqueous solution (3% Natrosol 250MR) | 150.00 | |
| 6% aqueous solution (6% Natrosol 250MR) | | 98.76 |
| Water | | 28.22 |
| Defoamer (colloids 581B) | 2.00 | 2.12 |
| Total | 1,079.50 | 1,086.73 |
| W/G, lbs.: | | |
| Actual | 10.80 | 10.86 |
| Theoretical | 10.79 | 10.86 |
| Freeze/thaw resistance, 5 cycles [1] | Pass | Pass |
| Accelerated aging 3 wks. at 120° F [2] | Pass | Pass |
| Viscosity: | | |
| Initial,[3] KU | 94 | 96 |
| 1 week, KU | 96 | 99 |
| 1 month, KU | 100 | 100 |
| Scrub resistance [4] | 500 | 600 |
| PVC, percent | 35 | 35 |

[1] Each cycle consisted of a 24 hour period during which a one pint can of paint was cooled for 16 hours at 10° F.±5° F. followed by 8 hours standing at 75° F.±5° F. The paint was examined after each cycle for graininess and coagulation.
[2] A one pint can of paint is stored at 120° F. and examined at the end of each week for increased viscosity.
[3] ASTM Standard Test D-562 reported in Krebs Units (KU).
[4] ASTM Standard Test D-2486-66T modified by using 24 hours drying time, a 6 mil draw down blade and a hog-bristle brush.

EXAMPLE II.—POLYVINYL ACETATE COPOLYMER LATEX PANT

| | Mfgs. recommended formulation | FMC Formula |
|---|---|---|
| Water | 210.00 | 205.99 |
| K₂CO₃ | .92 | .92 |
| KTPP | 1.39 | 1.39 |
| Isooctyl carbamate | | 5.28 |
| PMA-30 | 0.46 | 0.46 |
| Tamol 731 | 4.67 | |
| Solubilized water dispersable lecithin (Emultex R) | 1.87 | |
| Ethylene glycol | 18.70 | 18.48 |
| Defoamer (Nopco NXZ) | 1.87 | |
| Natrosol 250MR | 1.87 | 1.87 |
| Blend together, then add with high shear: | | |
| Titanium dioxide | 187.00 | 184.77 |
| Clay, aluminum silicate (Icecap K) | 116.80 | 115.48 |
| Calcuim carbonate | 46.70 | 46.19 |
| Reduce stirring speed and add— | | |
| Polyvinyl acetate copolymer (Polyco 804PL) | 252.00 | 250.36 |
| Water | 94.70 | 93.70 |
| Natrosol 250MR,% | 173.40 | 172.36 |
| Total | 1,112.35 | 1,097.25 |
| W/G, lbs.: | | |
| Actual | 10.88 | 10.77 |
| Theoretical | 11.12 | 10.97 |
| Freeze/thaw resistance, 5 cycles | Pass | Pass |
| Accelerated aging 3 wks. at (120 °F | Pass | Pass |
| Viscosity: | | |
| Initial, KU | 78 | 80 |
| 1 week, KU | 78 | 84 |
| 1 month, KU | 80 | 84 |
| Scrub resistance | 30 | 65 |
| PVC, percent | 48 | 48 |

EXAMPLE III.—STYRENE-BUTADIENE LATEX PAINT

| | Mfgs. recommended formulation | FMC formula |
|---|---|---|
| Water | 200.00 | 205.23 |
| KTPP | | 1.03 |
| Isooctyl carbamate | | 3.08 |
| Tamol 731 | 8.00 | |
| Lecithin (R & R 551) | 5.00 | |
| PMA-30 | .28 | .31 |
| Propylene glycol | 30.00 | 30.78 |
| Methyl cellulose (Methocel 60HG—2%) | 85.00 | 87.22 |
| Defoamer (Nopco NDW) | 2.00 | |
| Blend together and add with high shear: | | |
| Rutile TiO₂ | 180.00 | 184.70 |
| Clay, aluminum silicate (Sanitone Special) | 125.00 | 124.60 |
| Calcium carbonate | 550.00 | 553.92 |
| Reduce stirring speed and add— | | |
| Styrene-butadiene latex—Dow 308 | 170.00 | 174.44 |
| Water | 61.40 | 63.03 |
| Methocel 60HG, 2% | 115.00 | 118.74 |
| Defoamer (Nopco NXZ) | 4.00 | 4.10 |
| Total | 1,135.68 | 1,151.19 |
| W/G, lbs.: | | |
| Actual | 11.13 | 11.70 |
| Theoretical | 11.36 | 11.5[1] |
| Freeze/thaw stability | Failed—1 cycle | Passed 5 cycle[s] |
| Accelerated aging 3 wks. at (120° F | Pass | Pas[s] |
| Viscosity: | | |
| Initial, KU | 68 | 7[0] |
| 1 week, KU | 70 | 7[9] |
| 1 month, KU | 73 | 8[5] |
| Scrub resistance | 20 | 2[7] |
| PVC, percent | 62 | 62 |

This invention has been explained and exemplified in a manner so that it can be readily practiced by those skilled in the art. The best mode contemplated by the inventor has been set forth. Clearly, within the scope of the appended claims, the invention can be practiced by those skilled in the art having the benefit of the disclosure, otherwise than as specifically described and exemplified herein.

What is claimed is:

1. In the method of making a synthetic polymer emulsion paint in which the bulk of the pigment to be used in the paint is dispersed in an aqueous suspension prior to mixing the dispersed pigment suspension with the synthetic polymer emulsion, the improvement which comprises having as the essential additive used in dispersing the pigment suspension 0.01 to 1% isooctyl carbamate based on the total weight of the total paint, the synthetic polymer emulsion being selected from the group consisting of styrene-butadene emulsion, polyvinyl acetate emulsion and emulsion of a copolymer of an alkyl acrylic ester, the alkyl having 1 to 18 carbon atoms with a monomer selected from the group consisting of methacrylic acid, acrylic acid, acrylamide, 2-hydroxyethyl methacrylate, glycidyl methacrylate, 2-hydroxypropyl methacrylate, dimethylaminoethyl methacrylate, tert-butylamino methacrylate, ethylene dimethacrylate, trimethylolpropane trimethacrylate, butylene dimethacrylate, diethylaminoethyl acrylate and vinyl ethylene and mixtures of said acrylic copolymer with a polymer selected from the group consisting of polyvinyl chloride and polyvinyl acetate.

2. A synthetic polymer emulsion paint in which the bulk of the pigment used in the paint is dispersed in an aqueous suspension prior to mixing the dispersed pigment suspension with the synthetic polymer emulsion characterized in that the essential additive used in dispersing the pigment is 0.01 to 1% isooctyl carbamate based on the total weight of the total paint, the synthetic polymer emulsion being selected from the group consisting of styrene-butadiene emulsion, polyvinyl acetate emulsion and emulsion of a copoymer of an alkyl acrylic ester, the alkyl having 1 to 18 carbon atoms with a monomer selected from the group consisting of methacrylic acid, acrylic acid, acrylamide, 2-hydroxyethyl methacrylate, glycidyl methacrylate, 2-hydroxypropyl methacrylate, dimethylaminoethyl methacrylate, tert-butylamino methacrylate, ethylene dimethacrylate, trimethylolpropane trimethacrylate, butylene dimethacrylate, diethylaminoethyl acrylate and vinyl ethylene and mixtures of said acrylic copolymer with a polymer selected from the group consisting of polyvinyl chloride and polyvinyl acetate.

References Cited

UNITED STATES PATENTS

| | | | |
|---|---|---|---|
| 3,316,197 | 4/1967 | Hill | 260—29.6 MN |
| 3,400,093 | 9/1968 | Feinberg | 260—29.6 MN |

WILLIAM H. SHORT, Primary Examiner

L. M. PHYNES, Assistant Examiner

U.S. Cl. X.R.

260—17 R, 17.4 BB, 29.6 ME, 29.6 MP, 29.7 P, 29.7 E, 41 A, 41 B, 41.5 R, 887, 899, 901

UNITED STATES PATENT OFFICE
CERTIFICATE OF CORRECTION

Patent No. 3,758,432　　　　　　　　Dated September 11, 1973

Inventor(s) THEODORE R. HOPPER

It is certified that error appears in the above-identified patent and that said Letters Patent are hereby corrected as shown below:

Column 2, line 28, "resin" should read --rosin--.

Column 5, line 63, Example II, "%" should read --2%--.

Column 6, Example III, "550.00 553.92" should read --150.00 153.92--.

Column 6, Example III, "2%" should read --2%)--.

Column 6, Example III, "7o" should read --76--.

Signed and sealed this 2nd day of July 1974.

(SEAL)
Attest

EDWARD M. FLETCHER,JR.　　　　　　C.MARSHALL DANN
Attesting Officer　　　　　　　　　Commissioner of Patents